United States Patent Office 3,439,886
Patented Apr. 22, 1969

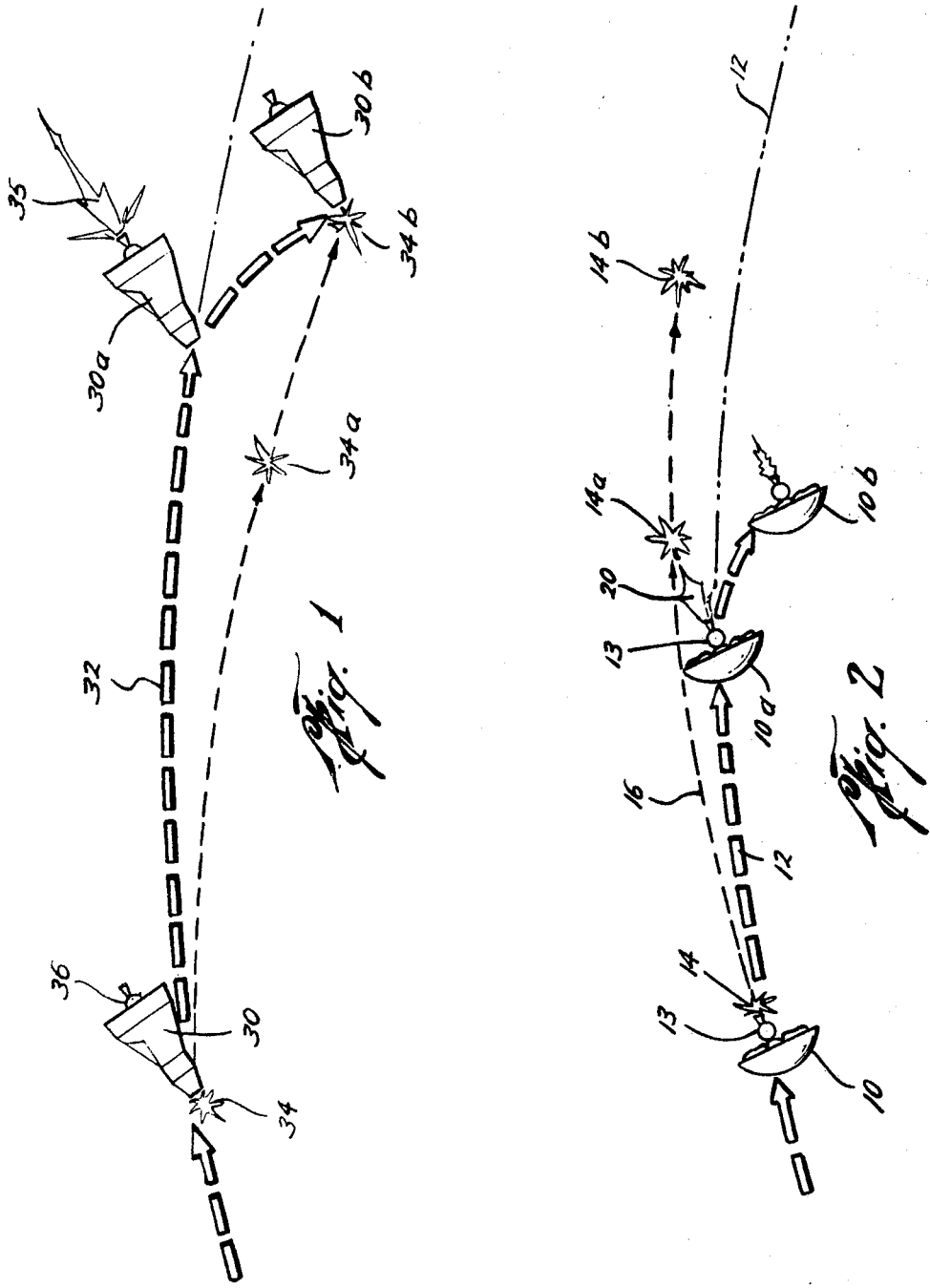

3,439,886
VISUAL TARGET FOR RETROFIRE ATTITUDE CONTROL
Caldwell C. Johnson, Dickinson, Tex., assignor to the United States of America as represented by the Administrator of the National Aeronautics and Space Administration
Filed Sept. 26, 1968, Ser. No. 762,936
Int. Cl. B64g 1/00; F41g 7/00
U.S. Cl. 244—1         10 Claims

ABSTRACT OF THE DISCLOSURE

A method for controlling retrofire attitude of an orbital escape spacecraft having manually controlled retrorocket thrust means wherein the thrust vector of the retrorocket means is directed generally forward along the orbital path and a visual target is ejected along the axis of such thrust vector to establish a bearing by which attitude of the spacecraft may be adjusted.

---

The invention described herein was made by an employee of the United States Government and may be manufactured and used by or for the Government for governmental purposes without the payment of any royalties thereon or therefor.

Background of the invention

In the orbital flight of a manned spacecraft, "re-entry" of the craft for an Earth landing is accomplished by projecting the thrust vector of a rocket (secured to the craft) forward and generally along the orbital path thereby reducing the orbital velocity of the spacecraft for the landing. During operation of the rocket which is termed "retrofire," attitude of the spacecraft must be maintained so that the thrust vector of the retrorocket is continually directed generally forward along the orbital path. While proper attitude is normally maintained automatically, it may become necessary to maintain attitude manually if automatic controls malfunction. Moreover, escape craft for use in emergency escape from a mother craft such as disclosed in Caldwell C. Johnson's U.S. Patent 3,330,510 and J. H. Quillinan's U.S. Patent 3,229,936 are not equipped with automatic attitude controls.

Thus attitude of the escape craft is manually controlled by reference to a visual target. Heretofore such visual targets have included star fields and points on the horizon. However, during nocturnal navigation such targets are easily obscured from vision by the exhaust plume of the retrorocket which obliterates these relatively dim natural reference points. To overcome this problem, the present invention provides a target in the proximity of the spacecraft that is visible to an astronaut within the craft and provides a bearing for purposes of adjusting attitude of the spacecraft with reference to the visual target.

Summary of the invention

The present invention provides a method for manually controlling the retrofire positioning of a spacecraft. Prior to retrofire, the spacecraft is positioned whereby the thrust vector of the retrorocket thrust means is directed generally forward along the ortibal path. A visual target is ejected along the axis of such thrust vector to establish a bearing. By observing the visual target, attitude or position of the spacecraft may be properly adjusted to carry out re-entry.

It is therefore, an object of the present invention to provide a method for manually controlling attitude of a spacecraft.

A further object of the present invention is to control attitude of a spacecraft during retrofire by ejecting a visual target generally forward along the orbital path of the spacecraft.

Yet another object of the present invention is the provision of a method for manually controlling retrofire attitude of an orbital spacecraft by ejecting a visual target along the orbital path of the spacecraft to establish a bearing generally coincident with the orbital path for purposes of maintaining proper attitude control during re-entry.

A still further object of the present invention is the provision of such a method wherein the visual target comprises a visible flare or a plurality of visible flares ejected in sequence, or a flashing light.

Other and further objects, features and advantages will be apparent in the following description of the preferred embodiment of the present invention, given for the purpose of disclosure and taken in conjunction with the accompanying drawings.

Description of the drawings

In the drawings accompanying the present invention, like character references designate like parts throughout the several views wherein, FIGURE 1 depicts a method of ejecting a visual flare in a direction generally opposite (retrograde) to the forward orbital movement of the spacecraft, and FIGURE 2 represents a method of ejecting a flare generally along and forward of (posigrade) the orbital path of the spacecraft as will now be described.

Description of the preferred embodiment

With reference to the drawings and first to FIGURE 2, an escape spacecraft in an orbital path is represented by the reference numeral 10 in the orbital track or ecliptic 12. The spacecraft may be of the type disclosed in prior mentioned U.S. Patents 3,330,510 and 3,229,936 which, although having a retrorocket assembly 13, has no instrumented attitude control system. While the spacecraft is in the position 10 as shown and to prepare for retrofire, the crewman adjust the attitude of the spacecraft preferably to an elevation angle slightly above the orbital track 12 although still generally in the direction of the ecliptic. Prior to retrofire for re-entry and an earth landing, a visual target such as a flare or flashing light 14 is ejected approximately along the ecliptic path 12 although the preferred trajectory is at a slight angle above the orbital track as represented by the reference numeral 16. Assuming orbital velocity of the spacecraft to be at about 25,500 feet per second, the visual target 14 is ejected at a velocity sufficient to carry it ahead of the spacecraft such as about 10 feet per second. Then, after the flare has separated from the spacecraft, for example, 100 feet or so, the retromotor or retrorocket 13 is fired when the spacecraft is positioned as indicated by the reference numeral 10a. At this point the visual target 14 has assumed the position 14a and is of sufficient brilliance to be visible to the crewman notwithstanding luminosity of the exhaust plume 20.

As the retrorocket 13 causes a reduction in velocity of the spacecraft 10 along its orbital path 12, the spacecraft begins to move toward earth such as indicated by the reference numeral 10b. At this point the visual target has assumed the position 14b and continues to provide a bearing generally coincident with orbital path 12 of the spacecraft so that the crewman may maintain proper attitude control whereby the thrust vector of the retrorocket 13 provides a maximum effective retrograde thrust.

Of course, in few minutes time subsequent to firing of the retrorocket 13, the spacecraft will fall far behind the visual target 14 so that visibility of the target from the spacecraft will diminish and no longer provide an effective bearing. If it is desired that a visual target be maintained for a longer period of time at such point, a series of flares may be used and ejected in sequence during retrofire. It will be appreciated, however, that accuracy of such a sequence visual target means creates an accumulative error in that each succeeding sequenced target will assume an increasing greater angle relative to the original orbital track 12. Nevertheless, such accumulative error will be inconsequential as a practical matter.

The foregoing discussion with reference to FIGURE 2 describes a method of controlling attitude of the spacecraft 10 wherein the visual target is ejected in the same direction of travel (posigrade) as the craft along the orbital track. If it is desired to provide a visual target for a spacecraft wherein visibility is limited to the opposite direction of travel of the spacecraft, i.e. the opposite direction from the posigrade thrust vector of the retrorocket, then it is advantageous to eject the visual target in retrograde. Thus, as shown in FIGURE 1, the spacecraft 30 is traveling, for example, at an orbital velocity of 25,500 feet per second along the orbital track 32 and, prior to retrofire, assumes a proper position and atitude as shown. Just before retrofire, a visual target 34 is ejected at, for example, 50 feet per second in retrograde, i.e. in the opposite direction from the posigrade thrust vector of the retrorocket motor 36. The retrorocket motor 36 is then fired after the visual target 34 has separated from the spacecraft a suitable distance as indicated positionwise, for example, by the reference numeral 30a. At such point the visual target 34 assumes position 34a thereby providing a target or bearing visible through the exhaust plume 35 for proper control of attitude of the spacecraft as previously described. It will be recognized that as the spacecraft 30 continues to reduce its orbital velocity, the visual target will in effect catch up with the spacecraft. This phenomenon is represented in FIGURE 1 by position 30b of the spacecraft and position 34b of the flare. At this point, however, the spacecraft 30 will have slowed from its orbital velocity sufficiently for purposes of re-entry.

As will be appreciated, the efficacy of the present invention depends largely upon the brilliance and visibility of the target ejected from the spacecraft to overcome the luminosity of the retrorocket plume. Suitable conventional flashing light targets may be used and ejected from, for example, a mortar device secured to the spacecraft. If a flare is to be used, it would be advantageous to combine such flare with the retrorocket motor in a suitable manner thereby facilitating ejection of the flare target and simplifying manipulative operation required on the part of the crewman. Furthermore, if sequenced flares are to be used which are somewhat analoqous to a "Roman candle," the sequenced ejection operation can be carried out automatically by combining the flare system with the retrorocket motor.

Thus provided is an effective method of maintaining correct attitude control of a manually controlled orbital spacecraft and particularly an escape craft throughout a nocturnal or night time retrofire phase. By ejecting a visual target according to the present invention prior to firing of the retrorocket motor, such visual target assumes a position generally coincident with the axis of the thrust vector of the retrorocket motor or the orbital track itself whereby the crewman within the spacecraft may adjust position or attitude thereof by mere visual reference to the ejected target.

The invention, therefore, is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art and which are encompassed within the spirit of the invention.

What is claimed is:

1. A method for controlling retrofire positioning of a spacecraft having retrorocket thrust means, including the steps of,
    (a) positioning the spacecraft such that the thrust vector of the retrorocket thrust means is directed generally forward along the path of the spacecraft,
    (b) ejecting a visible target means along such path of the spacecraft, and
    (c) adjusting position of the spacecraft with reference to the visual target means.

2. The method for controlling retrofire positioning of a spacecraft as described in claim 1 wherein said visual target means comprises a visible flare.

3. The method for controlling retrofire positioning of a spacecraft as described in claim 1 wherein said visual target means comprises a plurality of visible flares ejected in sequence.

4. The method for controlling retrofire positioning of a spacecraft as described in claim 1 wherein said visual target means comprises a flashing light.

5. A method for manually controlling retrofire attitude of an orbital spacecraft having retrorocket thrust means, including the steps of,
    (a) positioning the spacecraft such that the thrust vector of the retrorocket thrust means is directed generally forward along the orbital path of the spacecraft,
    (b) ejecting a luminous target along the axis of the thrust vector, and
    (c) adjusting attitude of the spacecraft with reference to the luminous target.

6. The method of claim 5 wherein the luminous target is ejected from the spacecraft in the same direction as the thrust vector of the retrorocket thrust means at a velocity sufficient to establish a bearing generally coincident with the orbital path of the spacecraft prior to retrofire.

7. The method of claim 5 wherein the luminous target is ejected from the spacecraft in the opposite direction from the thrust vector of the retrorocket thrust means.

8. The method of claim 6 wherein the luminous target comprises a visible flare.

9. The method of claim 6 wherein the luminous target comprises a plurality of visible flares ejected in sequence.

10. The method of claim 6 wherein the luminous target comprises a flashing light.

References Cited

UNITED STATES PATENTS

| | | |
|---|---|---|
| 3,118,636 | 1/1964 | Kantrowitz et al. |
| 3,224,709 | 12/1965 | Blizard. |

MILTON BUCHLER, *Primary Examiner.*

J. L. FORMAN, *Assistant Examiner.*

U.S. Cl. X.R.

244—3.16